S. F. ARBUCKLE.
SELF LUBRICATING PISTON.
APPLICATION FILED FEB. 26, 1918.
1,294,023.
Patented Feb. 11, 1919.
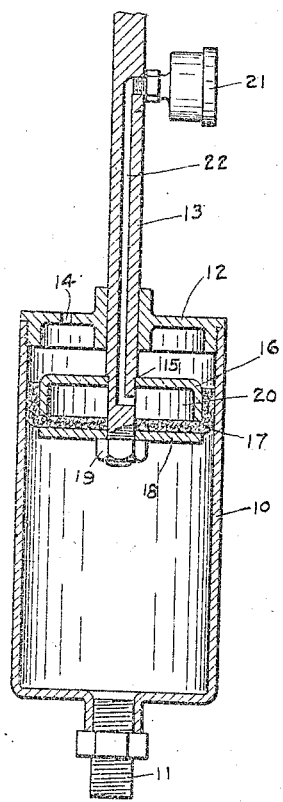
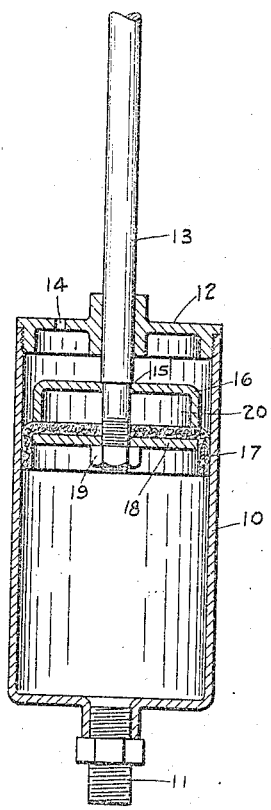
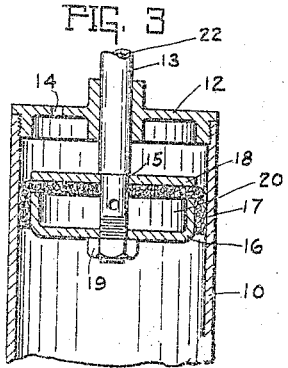
INVENTOR
SAMUEL F. ARBUCKLE
BY
Lockwood & Lockwood
ATTORNEYS

UNITED STATES PATENT OFFICE.

SAMUEL F. ARBUCKLE, OF INDIANAPOLIS, INDIANA.

SELF-LUBRICATING PISTON.

1,294,023.   Specification of Letters Patent.   Patented Feb. 11, 1919.

Application filed February 26, 1918. Serial No. 219,208.

REISSUED

*To all whom it may concern:*

Be it known that I, SAMUEL F. ARBUCKLE, a citizen of the United States, and a resident of Indianapolis, county of Marion, and State of Indiana, have invented a certain new and useful Self-Lubricating Piston; and I do hereby declare that the following is a full, clear, and exact description thereof, reference being had to the accompanying drawings, in which like numerals refer to like parts.

The object of this invention is the automatic lubrication of the packing of the piston in a cylinder, adapted particularly for utilizing or pumping air or gas so that the device will never leak and have at all times its maximum power and efficiency.

To the foregoing end, one feature of the invention consists in combining with a leather or other packing for a piston, of a lubricating chamber in the piston for containing oil or lubricating material in contact with the packing so that it will be conveyed by capillary attraction to the surfaces of the packing which engages the cylinder, and thus maintain an air or gas tight joint, and also keep the metal or other packing in good condition so as to contribute to its long life. This lubricating chamber may be made by merely utilizing a hollow piston, as herein shown. There may also be an oil cup secured to the piston rod and communicating with said oil chamber in the piston by means of a conduit piston rod.

Another feature of the invention consists in combining with the piston, a disk of leather or other packing material, the annular edge portion of which is bent over and around the piston for furnishing the surface to engage the cylinder and by making said surface relatively ide so as to obtain a wide bearing surface and thereby avoid the evil effects or wearing action resulting from jarring or vibration of the device while in operation.

The full nature of the invention will be understood from the accompanying drawings and the following description and claims:

In the drawings, Figure 1 is a central longitudinal section of a cylinder and piston including my invention. Fig. 2 is a central longitudinal section of a modified form. Fig. 3 is a similar section of still another modified form.

There is shown herein a cylinder 10 provided with means 11 at one end for connecting an air or gas conduit. The other end of the cylinder is open and internally threaded to receive a cap 12. A piston rod 13 operates through this cap. The cap has an air vent 14 in it.

The inner portion of the piston rod is reduced to leave a shoulder 15. On the reduced portion a cup-shaped piston 16 is placed, being of somewhat smaller diameter than the cylinder. Over the open end of this cup-shaped piston member a leather washer or disk packing 17 fits, its diameter being great enough for its peripheral portion to be bent back over and around the periphery of the piston and fit tightly between the piston and cylinder. A metal washer 18 is then placed on the piston rod against the packing 17 and it is tightened down by a nut 19. This washer should be of about the same diameter as the piston so as to clamp and hold securely the packing between the piston and the washer.

It is seen that this construction leaves a chamber 20 so that the piston is a hollow piston and has in it a chamber for holding oil or lubricating material in a relatively large quantity and in direct contact with the body of the packing. The oil will, of course, by capillary attraction, permeate all parts of the packing and keep it moist and in good condition.

This construction enables such a piston to be used a very long time without any attention to its lubrication. Ordinarily the lubrication is placed in the piston while it is assembled and then left there unless all used, but if desired, a further supply of lubricating material may be furnished by means of an oil cup 21 secured on the piston rod and provided with a conduit 22 leading from the oil cup longitudinally of the piston rod and opening into the chamber 20 in the piston. With this arrangement it becomes unnecessary to disassemble the device in order to charge the piston with oil as it may be supplied at intervals through the oil cup 21 and conduit 22.

In the modified form shown in Fig. 2, the packing is shown turned over the washer instead of the hollow piston. This is where the piston pushes instead of pulls. The principle, so far as lubrication is concerned, however, is the same.

The modified form shown in Fig. 3 reverses the construction shown in Fig. 1 in order to enable the device to be worked in the same situation as in Fig. 2. In other words, in Fig. 3 the hollow piston 16 is on the inner end of the piston rod and the washer is next to the shoulder 15 in said rod. The packing is clamped between them in exactly the same fashion as in Fig. 1, but reversed.

It is seen from the foregoing that such a cylinder and piston may be made air or gas tight and may be lubricated automatically by filling the chamber in the piston with lubricating material in immediate contact with the body of the packing.

The invention claimed is:

1. A piston rod one end thereof being reduced in diameter to form a shoulder, a cup-shaped piston member on said reduced end with one side open and the opposite side engaging said shoulder, a disk-shaped packing member on said rod and closing the opening in said piston member, and a washer on the piston rod of substantially the same diameter as the hollow piston member and on the opposite side of the packing for pressing the packing against the peripheral edge of said piston.

2. A piston rod, a cup-shaped piston member on said rod with one side open, a disk-shaped packing member on said rod and closing the opening in said piston member and with its peripheral portion overlapping and surrounding said piston member, and a washer on the piston rod of substantially the same diameter as said hollow piston member for clamping the packing tightly against said piston member.

3. A piston rod, a cup-shaped piston member on said rod with one side open, a disk-shaped packing member on said rod and closing the opening in said piston member and with its peripheral portion overlapping and surrounding said piston member, a washer of substantially the same diameter as the hollow piston member and on the opposite side of the packing, and a nut on the rod for clamping said packing between said washer and the hollow piston member.

4. A cylinder, a piston rod therefor with its inner end reduced and threaded and provided with a shoulder, a piston formed of a hollow member open on one side, a washer of substantially the same diameter as the piston, and a packing disk between the hollow member and the washer, all three of said last-mentioned elements being on the reduced portion of the piston rod, and a nut on the inner end of the piston rod for clamping said piston thereon against the shoulder.

5. A cylinder, a piston rod, a hollow piston on said rod having a chamber for lubricating material, and a packing disk closing one side of the hollow member and having its peripheral edge overlapping and surrounding said piston, said piston rod being provided with a longitudinal conduit in it extending outside of the cylinder and communicating with the lubricating chamber and the piston whereby said chamber may be supplied with lubricating material externally of the cylinder.

In witness whereof I have hereunto affixed my signature.

SAMUEL F. ARBUCKLE.